United States Patent [19]

Nagaya et al.

[11] Patent Number: 4,704,651
[45] Date of Patent: Nov. 3, 1987

[54] CASSETTE TAPE DECK OPERATING MECHANISM

[75] Inventors: Hideshi Nagaya; Yoshio Saito, both of Saitama, Japan

[73] Assignee: Pioneer Electronic Corporation, Tokyo, Japan

[21] Appl. No.: 690,069

[22] Filed: Jan. 9, 1985

[30] Foreign Application Priority Data

Jan. 9, 1984 [JP] Japan .................................. 59-1481

[51] Int. Cl.⁴ .............................................. G11B 5/00
[52] U.S. Cl. ..................................... 360/137; 360/96.6
[58] Field of Search ............................... 360/137, 96.6

[56] References Cited

U.S. PATENT DOCUMENTS 3,849,799 11/1974 Nakamichi ......................... 360/96.6
4,050,087 9/1977 Kishi ................................... 360/96.6

Primary Examiner—A. Michael Chambers
Attorney, Agent, or Firm—Sughrue, Mion, Zinn, Macpeak & Seas

[57] ABSTRACT

An operating mechanism for a cassette deck, particularly, a double-type cassette deck, with the use of which the overall size of the deck is significantly reduced. A swingable cassette holder is arranged to open and close a cassette container section within the body of the deck. A lock mechanism is provided for locking the cassette holder in the closed state thereof with respect to the cassette container section. An operating button for controlling the locking and unlocking operations of the lock mechanism is provided within the cassette holder.

3 Claims, 20 Drawing Figures

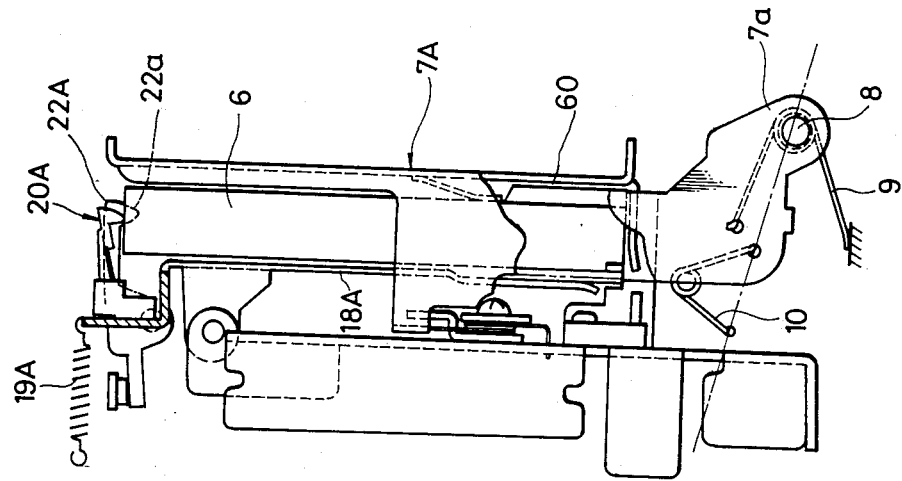
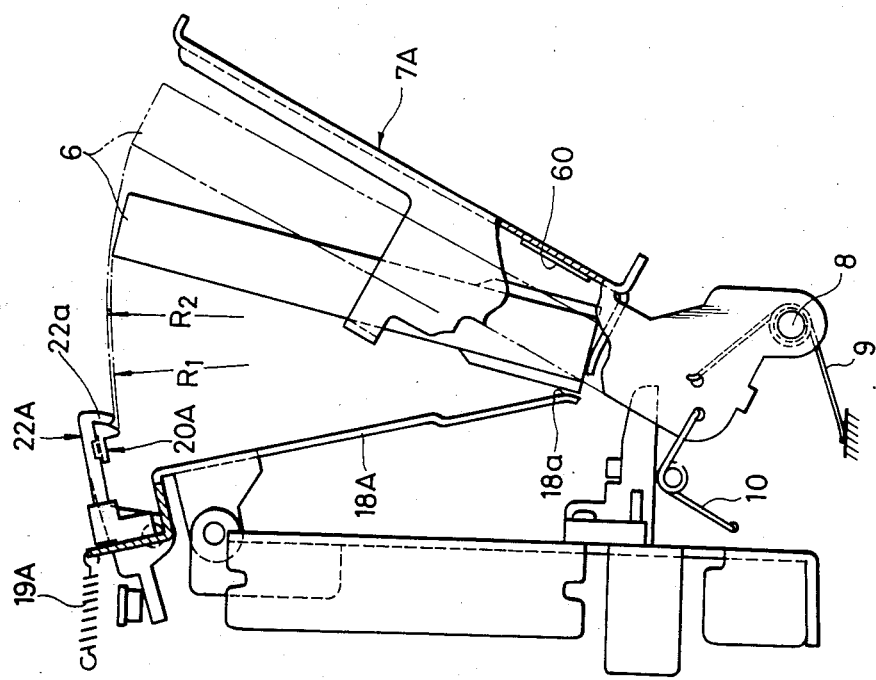

FIG. 10A    FIG. 10B    FIG. 10C
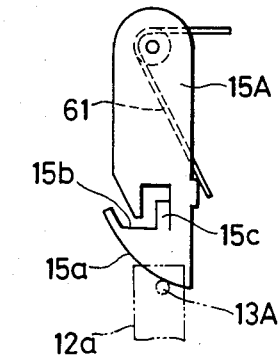 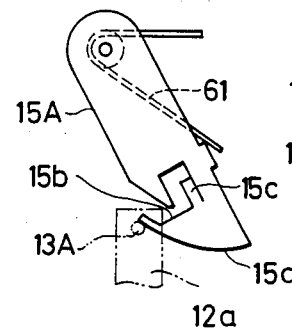 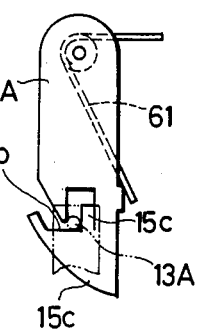
FIG. 10D    FIG. 10E    FIG. 10F
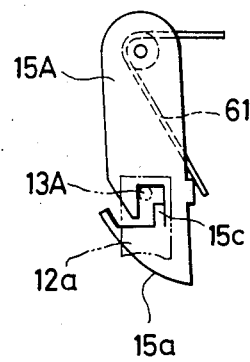 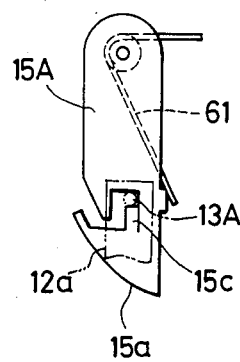 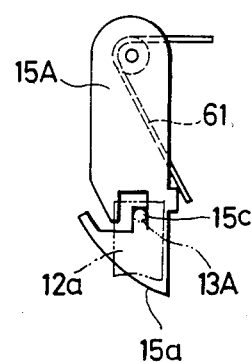

CASSETTE TAPE DECK OPERATING MECHANISM

BACKGROUND OF THE INVENTION

The present invention relates to a cassette tape deck operating mechanism, and particularly to an operating mechanism in a cassette deck provided with a so-called "kangaroo's pocket" type cassette holder.

Recently, component stereophonic systems have been greatly reduced in size, and various kinds of so-called "mini-component" stereophonic systems have been developed. It is easy to reduce in size a component stereophonic system mainly composed of electronic components such as a tuner, amplifier, and the like, but it is difficult to do so in a cassette tape deck that is mainly composed of mechanical components. Especially, in the case of double cassette deck provided with two deck portions so as to be able to perform dubbing, two substantially identical mechanisms are required, and therefore a reduction in size of the deck is more difficult. Heretofore, such a system has not been so miniatured as to correspond in size to other minicomponent stereophonic systems.

SUMMARY OF THE INVENTION

The present invention has been attained in view of the above-mentioned difficulties. A specific object of the invention is to provide a cassette tape deck operating mechanism which can contribute to minimization of the size of a cassette deck and which has an excellent performance.

A cassette tape deck operating mechanism according to the present invention is arranged such that an operating button for governing the locking and unlocking operations for a swingable cassette holder in its closed state is disposed within the cassette holder.

Further according to the present invention, a style plate for supporting a tape cassette at a predetermined position with respect to a tape drive mechanism is made to be swingable and arranged to swing in response to the swinging operation of a swing-type cassette holder, and a detection switch for detecting information as to the cassette holder is attached to the style plate. Thus, a cassette loading mechanism is obtained in which no coupling mechanism for actuating the detection switch as well as no space for arranging the switch are required, simplifying the mechanism and contributing to a reduction in the overall size of the cassette tape deck.

Yet further according to the present invention, a style plate for supporting a tape cassette at a predetermined position with respect to a tape drive mechanism is made swingable and is arranged to be urged in the direction away from the predetermined position. The tape cassette held in a swing-type cassette holder is pressed at its lower end by a swing tip end portion of the style plate when the cassette holder swings in the direction toward its closed position to cause the tape cassette to be substantially upright in the cassette holder, thereby minimizing the radius of swing of the top end of the tape cassette. Thus, it is possible to obtain a cassette loading mechanism in which the height of a cassette containing portion in a cassette deck can be decreased to thereby contribute to a reduction in the size of the cassette tape deck, especially in its thickness.

In accordance with another aspect of the present invention, a lock mechanism for locking a cassette holder in its closed state is made responsive to movement of a head base so that the head base is in its locked state when the head base is in its recording/reproducing position. As a result, it is possible to obtain a cassette loading/ejecting mechanism in which it is not necessary to provide any mechanism used exclusively for driving the lock mechanism, thereby further contributing to a reduction in the size of the cassette deck. Moreover, the cassette holder can never be opened during a recording/reproducing operation, even if there occurs a malfunction, so that the head, cassette halves, and the like are protected.

Moreover, according to the present invention, a lock mechanism for locking a cassette holder in its closed state is provided which responds to the movement of a head base actuated by a plunger such that the cassette holder is locked when the head base is in its recording/reproducing position. Reset means is also provided for releasing the locked state of the lock mechanism by forcibly releasing an actuator of the plunger. Hence there is obtained a cassette loading/ejecting mechanism in which it is required to provide no means for exclusive use for driving the lock mechanism, further contributing to the reduction in size of the deck. Also, it is possible to release the locked state of the cassette holder and to surely eject a tape cassette, even in the case where the plunger cannot be actuated due to a power interruption or the like.

According to a still further aspect of the present invention, means for urging a swingable-type cassette holder in the direction toward its opened state is constituted by at least two springs for providing forces acting in different regions within a swing region of the cassette holder so as to apply to the cassette holder a composite force which is substantially constant over all the swing region. A cassette loading/ejecting mechanism can therefore be obtained in which it is possible to apply a sufficient force to the cassette holder by a combination of small springs to thereby obtain more stable opening/closing operations of the cassette holder than in the case where a single large spring is employed. The space occupied by the springs may thus be small to thereby further contribute to the reduction in size of the cassette tape deck. The force applied to the cassette holder is made constant in loading a tape cassette, and it is possible to surely open the cassette holder at a constant speed in ejecting the tape cassette.

Moreover, according to the present invention, there is swingably provided a style plate for supporting a tape cassette in a predetermined position with respective to a tape drive mechanism, and the tape cassette is urged in a direction away from the predetermined position. Since the swingable-type cassette holder is urged by the force acting on the style plate in the closing side swing region where the force urging the cassette holder in the opening direction is weak, it is possible to obtain cassette loading/ejecting mechanism in which the force of the cassette holder is sufficient, even if a small spring is employed. The space occupied by the spring may be small so as to still further contribute to a reduction in the size of the cassette tape deck. Further, since it is possible to obtain an urging force substantially constant over all the swing region of the cassette holder, the force applied to the cassette holder in loading a tape cassette is made substantially constant so that it is possible to obtain smooth and stable operations and it is possible to surely open the cassette holder at a constant speed in ejecting the tape cassette.

In accordance with yet another aspect of the present invention, a swingable-type cassette holder is arranged as a double construction of a holder body and a bracket. Urging means is provided between the holder body and the bracket so that the cassette holder is locked in its closed state by the bracket. Therefore, it is possible to obtain a cassette loading mechanism in which the lock mechanism which has been conventionally provided outside the cassette holder can be disposed substantially within a frame of the cassette holder so as to further contribute to the reduction in size of the cassette tape deck. Further, since the over-stroke required in the locking operation can be obtained without providing any gap between the cassette holder and the deck body and rattle in the cassette holder is prevented in its locked state, it is possible to maintain constant the contact state of the tape against the head to provide stable and good recording/reproducing operations.

Yet moreover, according to the present invention, an operating button for controlling the locking operation of a lock mechanism and the lock releasing operation thereof is mounted at an opening portion formed in a cassette holder cover. Since a pawl portion for preventing the operating button from coming off, an urging arm portion for applying an urging force to the operating button and a guide piece slidably carrying the operating button are integrally molded of resin material, it is possible to obtain an operating mechanism for a cassette tape deck in which a lock/eject button, which has been provided conventionally outside the cassette holder, can be easily disposed within the cassette holder. The fitting structure of the operating button can be obtained very inexpensively and very simply, and the fitting work is very simple.

Finally, according to the present invention, a style plate for supporting a tape cassette at a predetermined position with respect to a tape drive mechanism is made to be swingable and arranged to swing in response to the swinging movement of a swing-type cassette holder. An actuator for actuating a switch for detecting information related to the tape cassette is arranged to swing in response to the swinging movement of the style plate. Thus, it is possible to obtain a cassette loading mechanism in which it is not necessary to provide any mechanism for releasing the actuator. Therefore, the loading mechanism is simple, also contributing to the reduction in the size of the cassette tape deck.

BRIEF DESCRIPTION OF THE DRAWINGS

FIG. 4 is a schematic side view showing the cassette holder in an intermediate state when the cassette holder swings to its closed state;

FIG. 5 is a schematic side view showing the cassette holder in its closed state;

FIGS. 10A to 10F are schematic plan views used for explaining lock/unlock operations of the cassette holder;

DESCRIPTION OF THE PREFERRED EMBODIMENTS

Figure 1:
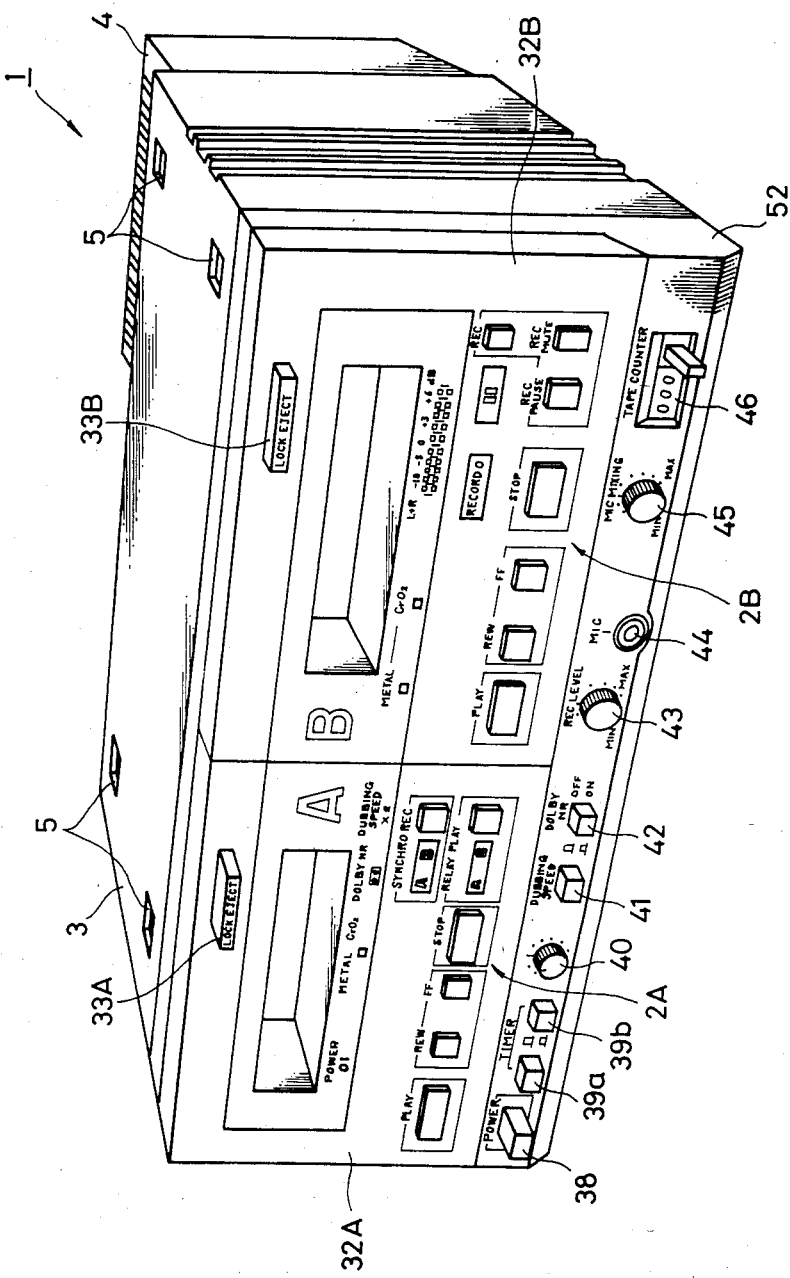
FIG. 1 is a perspective view of a cassette tape deck according to the present invention.

Referring to the drawings, the present invention will be described in detail hereunder.

Figure 2:
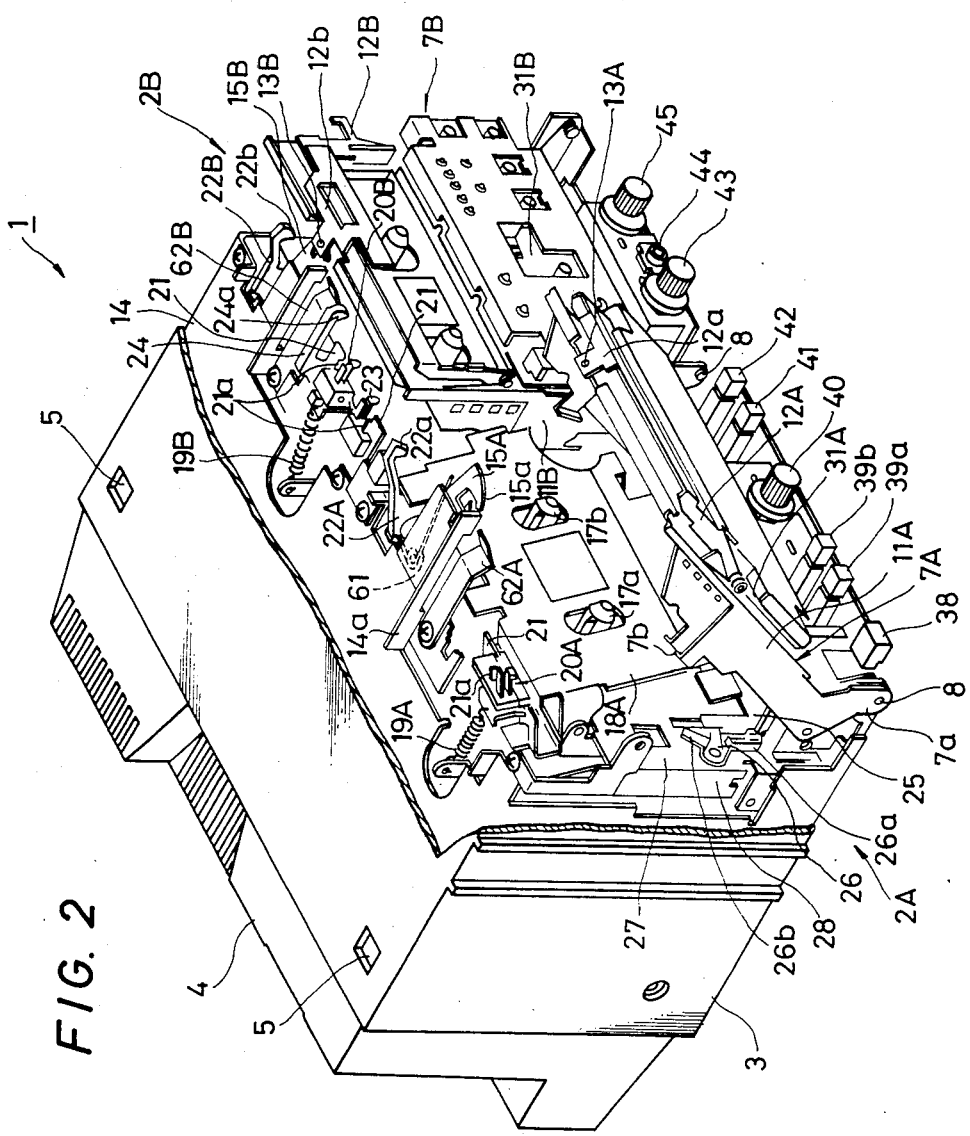
FIG. 2 is a perspective view showing an inner construction of a front section of the cassette tape deck.
Figure 3:
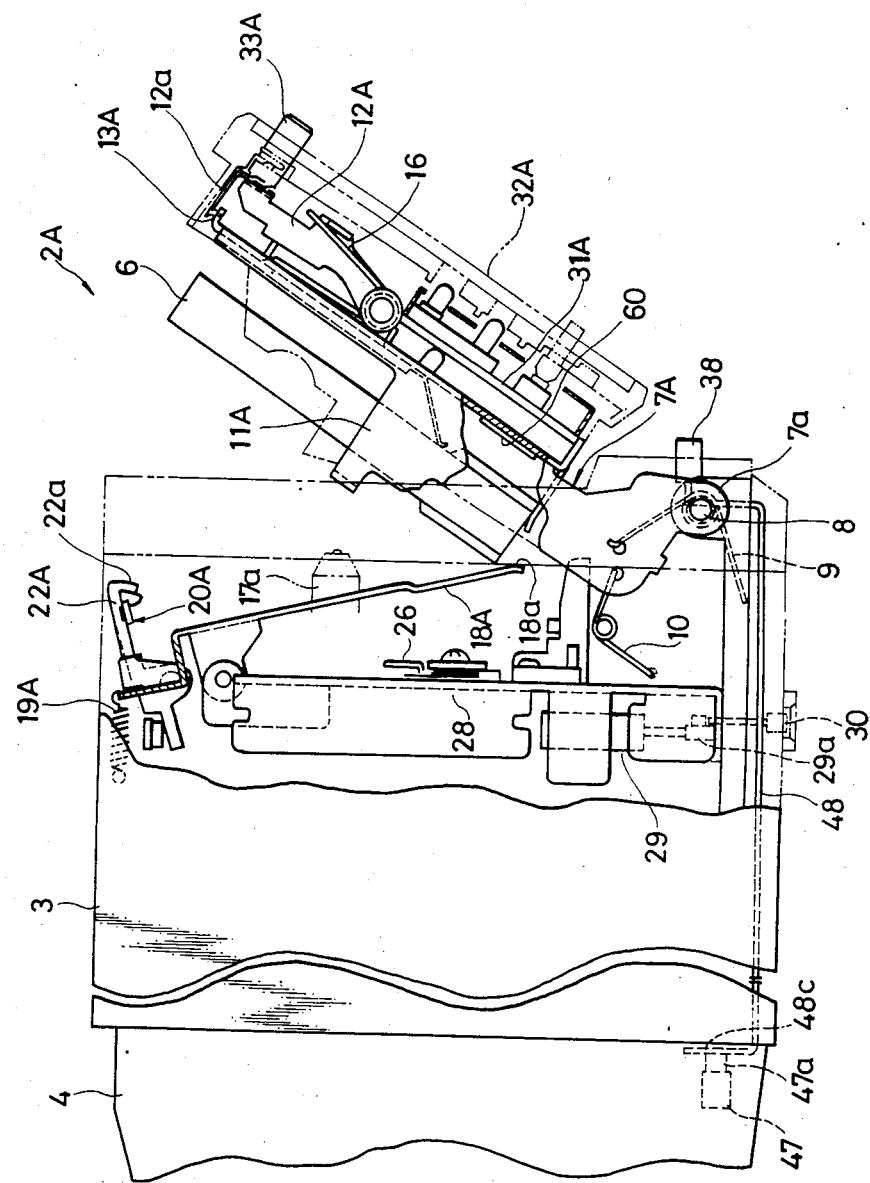
FIG. 3 is a schematic side view showing a cassette holder in its opened state.

Referring to FIGS. 1 to 3, a cassette tape deck 1 according to the present invention is a double cassette deck having two deck sections 2A and 2B so as to make the deck suitable for dubbing. The deck is basically constituted by two blocks, that is, a body section 3 including an operating section, a mechanical section and a control section, and a power section 4 connected to the rear portion of the body section 3. This deck is super-miniaturized so as to be usable in a mini-component stereophonic system by way of combination with an amplifier, a tuner and other components.

On the top surface of the body section 3 are four leg receivers 5 sized to receive leg portions of another component mounted on the body section 3 for preventing positional offset between the components. The deck section 2A is exclusively used for reproducing, while the deck 2B is capable of performing recording as well as reproducing. Since the deck section 2A for exclusive use for reproducing and the deck section 2B for use for both recording and reproducing have basically similar constructions, the present invention will be mainly described with reference to the deck section 2A.

Cassette loading is performed by a kangaroo's pocket type upright cassette holder 7A which holds a tape cassette 6 (shown in FIG. 3) in an upright state and which is openable/closable with respect to a cassette container section. The cassette holder 7A is swingably pivoted on a pivot shaft 8 at lower end of an arm portion 7a projecting forwardly from the front face of the cassette holder in the closed state (the state shown in FIG. 5), and is normally urged in the direction toward its opened position by at least two urging members, namely, a first spring 9 provided around the pivot shaft 8 and having opposite ends engaging with a chassis and the cassette holder 7A, and a second spring 10 having opposite ends engaging with the lower end of the cassette holder 7A and the chassis. The two springs 9 and 10 provide a substantially constant urging force to the cassette holder 7A over all its swinging area. That is, since the opposite ends of the spring 10 are directly aligned with the swing fulcrum of the cassette holder 7A (the axis of the pivot shaft 8) in the closed state of the cassette holder 7A as shown in FIG. 5 so that it does not restrict the swinging movement of the cassette holder 7A. The force of the spring 9 acts on the cassette holder 7A in the first half of its swing in the direction toward the opened position of the cassette holder 7A, while mainly the force of the spring 10 acts on the cassette holder 7A in the last half of its swing where the force of the spring 9 becomes weaker. Thus, the sum of the forces of the two springs 9 and 10 becomes substantially constant over the entire swing area of the cassette holder 7A. The same applies to the operation in the closing direction of the cassette holder 7A. Further, the movement of the cassette holder 7A is made smooth by the action of a damper (not shown).

In the cassette holder 7A, a bracket 12A is swingably pivoted with respect to a holder body 11A and urged in the direction toward the opened position (in the clockwise direction in FIG. 3) by a spring 16. The swing of the cassette holder 7a is controlled by a guide (not shown) provided between the holder body 11A and the bracket 12A. The bracket 12A swings along with the holder body 11A in the operation of the cassette holder 7. A lock pin 13A fixed to the upper projecting portion 12a engages with a pawl portion 15A attached to an upper chassis so as to lock the cassette holder 7A. A spacer 60, FIG. 4, is fixed to the inside of the cassette holder 7A at a position where it comes in contact with the left lower end portion of the tape cassette 6 at least when the cassette holder 7A is opened.

In the cassette container of the body section 3, a style plate 18A, which is a board-like supporting member for supporting the tape cassette 6 loaded in the container section by the cassette holder 7A in a predetermined position with respect to a pair of hub driving shafts 17a and 17b constituting a part of a tape driving mechanism, is swingably pivoted and urged by a spring 19A in the counterclockwise direction in FIG. 3. A part of the style plate 18A positioned above its fulcrum is abutted on an upper chassis 14 so as to limit the extent of the swinging movement in the urged direction. When the cassette holder 7A holding the tape cassette 6 is swung in the closing direction, the style plate 18A causes the tape cassette 6 to be substantially upright within the cassette holder 7A at a swing restriction position since its swing tip end portion 18a abuts the lower portion of the tape cassette 6 and then swings along with the cassette holder 7A so that the tape cassette 6 is supported at a predetermined position.

A cassette detecting leaf switch 20A for detecting the presence of a tape cassette is secured to a part of the style plate 18A above its swing fulcrum and is caused to operate upon engagement with the tape cassette 6 loaded at the predetermined position. A protection plate 21 integrally formed with the style plate 18A is positioned in the vicinity of the leaf switch 20A to prevent malfunctions of the switch 20A due to mechanical disturbances through the action of an upright portion 21a of the plate 21. An actuator 22A of a chromium-tape detecting switch (not shown) is swingably pivoted and engaged with the upper end of the style plate 18A. The actuator 22A is swung in response to the swinging movement of the style plate 18A and then returned to a position where the tape cassette loading is permitted when the tape cassette 6 is loaded, while after loading the actuator 22A actuates the detecting switch by allowing its pawl portion 22a to be inserted into a detection hole of the tape cassette 6.

It is sufficient to provide the above-mentioned two switches for the deck section 2A for use for reproducing, while the deck section 2B capable of recording is provided with an erasing-preventing leaf switch 23 and a metal-tape detecting switch (not shown). The erasing preventing leaf switch 23 is fixed on a style plate 18B, similarly to a cassette detecting leaf switch 20B, so as to prevent malfunctions due to mechanical disturbances by the upright section 21a of the protection plate 21 positioned in the vicinity of the erasing preventing leaf switch 23. On the other hand, the metal-tape detecting switch is arranged such that a pawl portion 24a of an actuator 24 which swings in response to the swing of the style plate 18B, similarly to the chromium-tape detecting switch, is fitted into the detecting hole of the tape cassette 6.

Referring to FIG. 2, a locking arm 26 responsive to the displacement of a head base 25 is rotatably pivoted with respect to a mechanism chassis 27 to constitute a locking mechanism for locking the cassette holder 7A. The locking arm 26 is urged to rotate by a spring 28 and an engaging portion 26a of the locking arm 26 normally engages with the head base 25 so that the locking arm 26 normally engages with the head base 25 so that the locking arm 26 is caused to rotate in the counterclockwise direction against the force of the spring 28 by the forward (in the upward direction in the drawing) movement of the head base 25, and the engaging portion 26b engages with a lock pawl 7b of the cassette holder 7a to thereby lock the cassette holder 7A in its closed state. As a result, when the head base 25 is in its advanced position, the cassette holder 7A cannot be opened by mistake so that damage is prevented to the head, tape cassette, etc.

For driving the head base 25, it is possible to use a well-known arrangement in which, for example, there are provided a gear having a non-toothed portion and which is urged to rotate in one direction to properly mesh with a flywheel gear so as to be driven to rotate, a head pin fixed to the head base 25 for causing the head base to advance by moving along a cam formed in the gear, and a lever for locking the gear selectively in its stopped state and in its playing state, whereby the head base 25 is driven in such a manner that the gear is released every time the lever is actuated and the gear is changed over from its stopped state to its playing state by the drive force of the flywheel gear while reversely changing from its playing state to its stopped state by its own rotational force. As shown in FIG. 3, a plunger 29 is used as a driving source for actuating the lever.

When the plunger 29 is used as a driving source, if the power is cut off for some reason while in the playing state, that is, in the advancing state of the head base 25, the lever of the drive mechanism cannot be actuated and the head base 25 cannot be retracted so that the cassette holder 7A is locked in its closed state and it becomes impossible to eject the tape cassette 6. Therefore, to prevent it becoming impossible to release the lock of the cassette holder 7A in such a case, a reset button 30 is provided on the bottom of the body section 3 for releasing the locked state (see FIG. 3). The reset button 30 is urged downwardly in FIG. 3 by a spring (not shown), and when depressed against this force, it pushes up the actuator 29a of the plunger 29. Thus, the lever can be actuated in the same way as the plunger 29 so that the head base 25 is retracted and the locked state of the cassette holder 7A by the locking arm 26 released in response to the retraction of the head base 25.

Printed substrates 31A and 31B on which are mounted a plurality of light-emitting diodes and switches are mounted on the respective front faces of the holder bodies 11A and 11B of the respective cassette holders 7A and 7B, and a portion of a display section and an operating section is arranged on the cassette holders 7A and 7B. The operating section is provided with various kinds of operating mode switches such as PLAY (reproducing), REW (rewind), FF (fast forward) and STOP (stopping). The display section, commonly used by the deck sections 2A and 2B, performs various kinds of display operations such as displaying a source dubbing speed, recording level, etc. As shown in FIG. 1, holder covers 32A and 32B are attached to the cassette holders 7A and 7B and operating buttons for the various operating mode switches are attached to the holder coves 32A and 32B.

Figure 6:
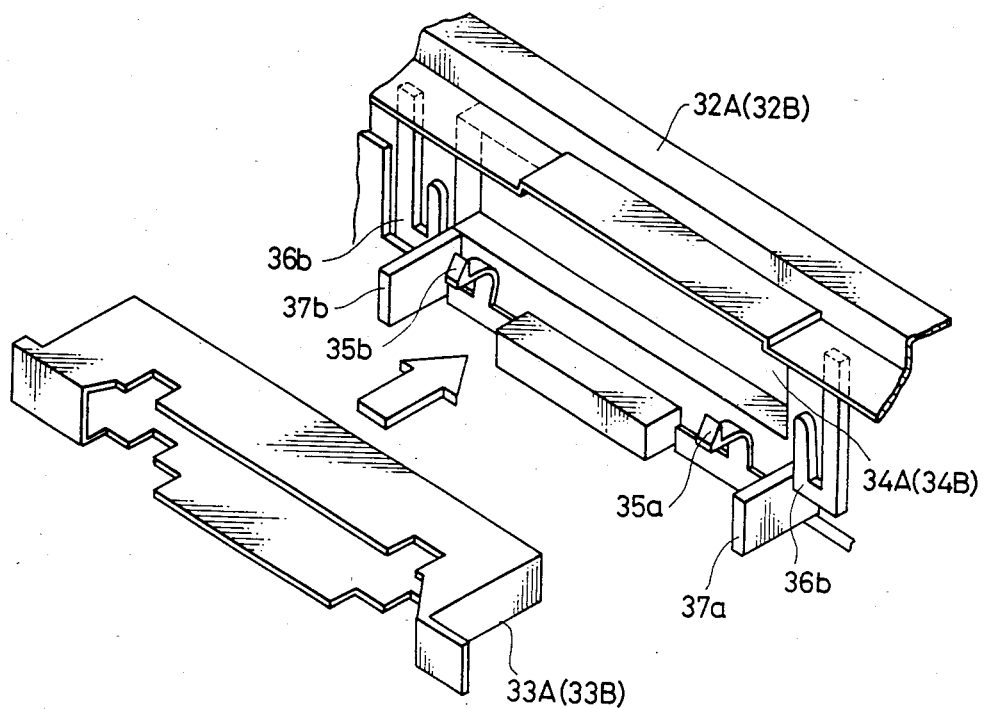
FIG. 6 is a decomposed perspective view showing a construction of a lock/eject button.

Lock-eject buttons 33A and 33B for the respective cassette holders 7A and 7B are disposed on the upper portion and the right side from the center in the face of the holder covers 32A and 32B. As shown in FIG. 6, the lock/eject buttons 33A and 33B are mounted in openings 34A and 34B formed in the holder covers 32A and 32B, protruding from the rear side of the covers and spring biased against the elastic force of a pair of pawl portions 35a and 35b integrally molded with the holder covers 32A and 32B (which are made of a resin material) and positioned at the respective lower portion of the opening sections 34A and 34B so that separation is prevented by the function of the pawl portions 35a and 35b. At the opposite sides of the opening sections 34AS and 34B, there are provided a pair of hook-like arms 36a and 36b for pressing the lock/eject buttons 33a and 33B against the brackets 12A and 12B of the cassette holders 7A and 7B in the state where the holder covers 32A and 32B are attached to the respective cassette holders 7A and 7B. Similarly to the pawl portions 35a and 35b, the arms 36a and 36b are integrally molded with the respective holder covers 32A and 32B of a resin material. The lock/eject buttons 33A and 33B are arranged such that they slide on slide portions 37a and 37b integrated with the respective holder covers 32A and 32B at the opposite lower ends of the opening portions 34A and 34B. The lock/eject buttons 33A and 33B release the cassette holders 7A and 7B from their locked and closed state when pressed in such a closed state of the cassette holders 7A and 7B, and lock the cassette holders 7A and 7B in the closed state when pressed in the opened state of the cassette holders 7A and 7B.

An electric source operating (on/off) button 38, timer buttons 39a and 39b, a tape speed adjusting knob 40, a dubbing speed changing-over button 41, a DOLBY NR (noise-reduction) button 42, a recording level adjusting knob 43, a microphone jack 44, a microphone mixing adjusting knob 45, and a tape counter 46 are substantially laterally aligned below the cassette holders 7A and 7B.

Figures 7A, 7B:
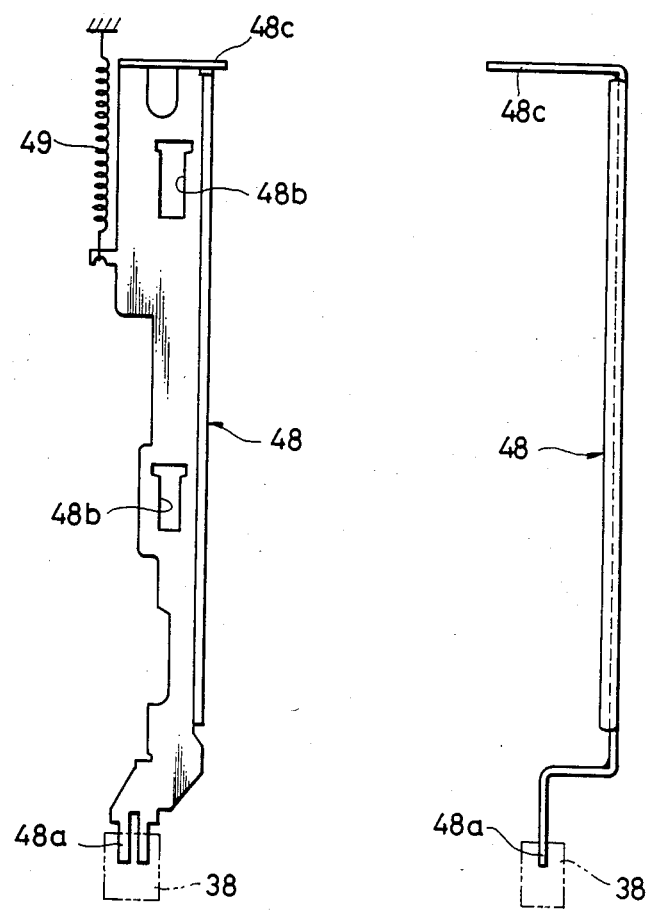
FIGS. 7A and 7B are, respectively, a plan view and a side view of an elongated lever in a source switch operational section.

As shown in FIG. 3, a source switch 47, the on-off state of which is set by the electric source operation button 38, is disposed within a source section 4 positioned in the rear of the body section 3. As shown in FIGS. 7A and 7B, an elongated lever 48 is disposed between the button 38 and the actuator 47a of the source switch 37 along a lower chassis. The button 38 is connected to the front end 48 engages with a T-shaped guide portion (not shown) of the chassis via two elongated holes 48b and 48a so as to be linearly slidable, and is urged in the direction toward the source switch 47 by a spring 49 with a smaller force than the restoration force of the actuator 47a of the source switch 47 so as to normally abut the actuator 47a of the source switch 47 with the rear rising portion 48c of the lever. According to this construction, since it is possible to combine the body section 3 with the source section 4 after individually assembling the body section 3 and the source section 4, the assembly work becomes very easy.

Figure 8:
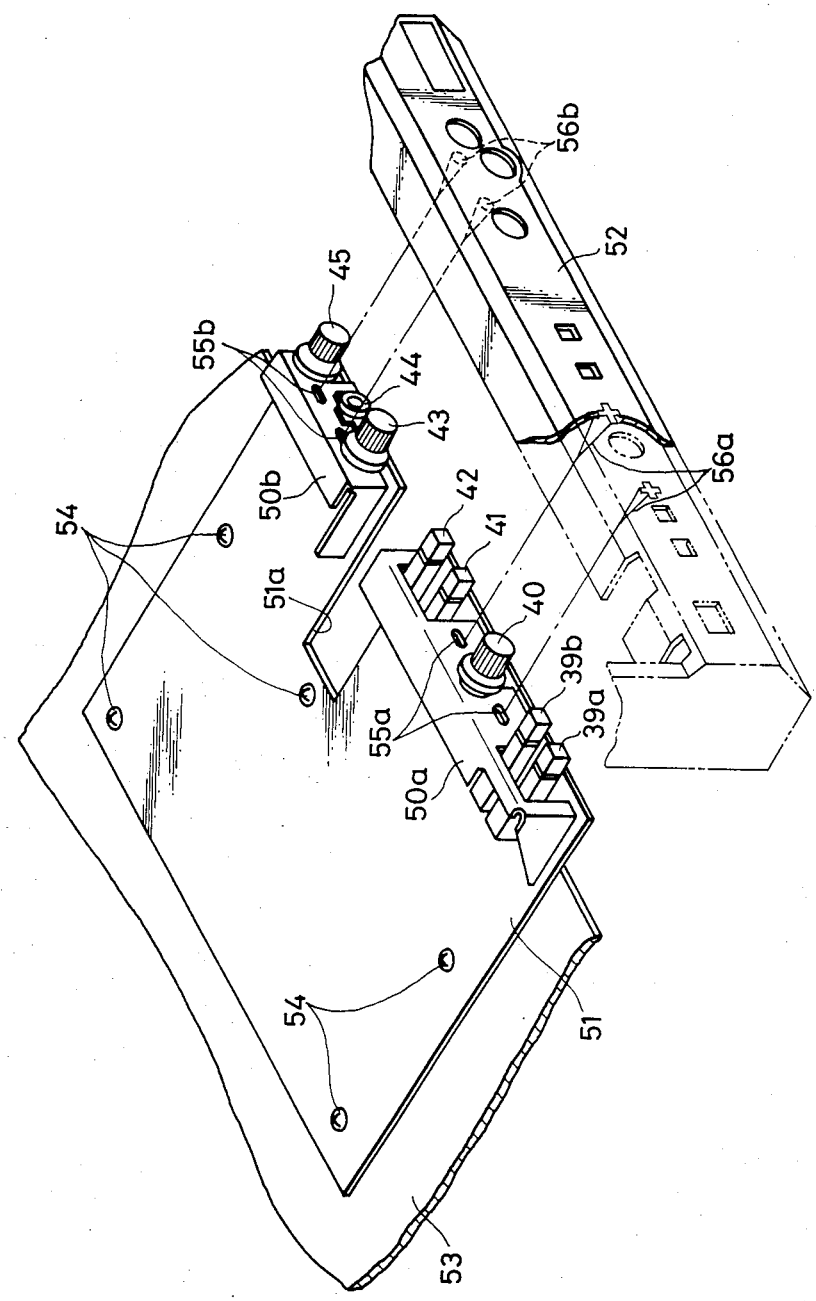
FIG. 8 is a decomposed perspective view showing the construction of an operating mechanism.

As will be apparent especially from FIG. 8, the timer buttons 39a and 39b, the tape speed adjusting knob 40, the dubbing speed changeover button 41, and the DOLBY NR button 42 are fixed to the front end of the print substrate 51 through the bracket 50a and connected to the respective actuators of the corresponding switches, while the recording level adjusting knob 43 and the microphone-mixing adjusting knob 45 are connected to the respective actuators of the corresponding switches fixed to the front end of the printed substrate 51 through a bracket 50b. These operating buttons and knobs are inserted into the respective holes formed in a front panel attached to the front face of the body section 3 and project forwardly of the panel. The printed substrate 51 has a cutaway portion 51a between the brackets 50a and 50b and is fixed at its rear portion to the lower chassis 53, for example, by five screws 54 with a predetermined gap therebetween. Since the printed substrate 51 is fixed at its rear portion and has the cutaway portion 51a, the front end portion on which various switches are fixed is vertically displaceable by its own elasticity with respect to the chassis.

Each of the brackets 50a and 50b, FIG. 8, is provided with two long holes 55a and 55b extending lengthwise parallel to the printed substrate 51. Circular cone protrusions 56a and 56b capable of respectively fitting into the holes 55a and 56b are integrally formed with the panel 52 in the vicinity of the holes in the inner face of the front panel 52. The long holes 55a and 55b and the protrusions 56a and 56b are respectively fitted to each other to thereby constitute a positioning device for the operating buttons and knobs relative to the holes of the front panel when the front panel is attached. Thus, for example, if, for instance, the printed substrate 51 becomes deformed over time, the positional relation between the respective operating buttons and knobs and the hole of the front panel 52 is maintained constant so as to maintain stable operational properties.

Figure 9A:
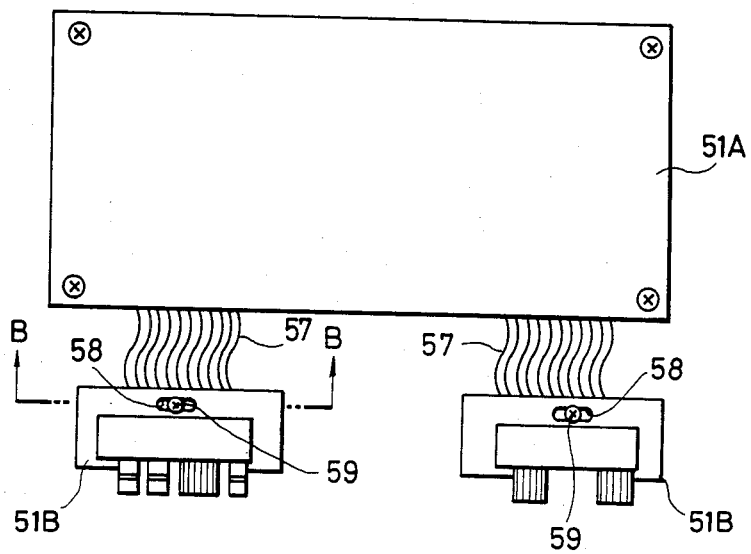
FIGS. 9A and 9B are, respectively, a plan view and a sectional view taken along a line B—B in FIG. 9A showing a modification of the arrangement of FIG. 8.
Figure 9B:
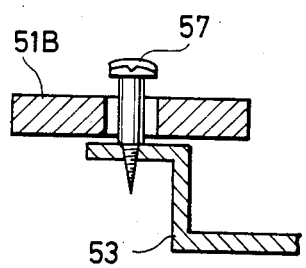

The above embodiment is arranged such that various kinds of switches are fixed to the printed substrate 51 and that the elasticity of the printed substrate 51 makes the printed substrate 51 displaceable relative to the chassis 53. As shown in FIGS. 9A and 9B, however, it is possible to make the printed substrate displaceable in such a manner that a printed substrate 51A on the circuit side is separated from printed substrates 51B and 51B on the switch side. These printed substrates 51B and 51B are electrically connected to the printed substrate 51A through flexible cables 57, the printed substrates 51B and 51B being attached to the chassis 53 by stepped screws 59 and 59 through the long holes 58 and 58, respectively.

Next, the cassette loading/ejecting operations in the cassette deck according to the present invention will be described hereunder.

As shown in FIG. 3, the tape cassette 6 is set into the cassette holder 7A in its opened state, and then the lock/eject button 33A is pushed to cause the cassette holder 7A to swing toward its closed position. When the cassette holder 7A is slightly swung, as shown in FIG. 4, the swing tip end portion 18a of the style plate 18A abuts the lower end portion of the tape cassette 6, and when cassette holder 7A is further swung in this state, the tape cassette 6 becomes substantially upright within the cassette holder 7A as shown by a solid line from the state shown by a two-dotted chain line in FIG. 4 by the pressing action of the swing tip end portion 18a of the style plate 18A. Then, the style plate 18A swings integrally with the cassette holder 7A through the tape cassette 6 and supports the tape cassette 6 at a predetermined position with respect to a pair of hub drive shafts 17a and 17b (see FIG. 2).

Since the cassette holder 6 becomes substantially upright within the cassette holder 7A in the step of swinging the cassette holder 74, the radius $R_1$ of the swing locus of the top end of cassette half 6 around the swing fulcrum (the pivot shaft 8) of the cassette holder 7A as its center is slightly smaller than the radius $R_2$ of the swing locus of the top end of cassette half 6 in its nonupright attitude (as shown by a two-dotted chain line), as is apparent in FIG. 4. As a result, the cassette half 6 can be smoothly displaced to its reproducing position without being caught at its upper end by the pawl portions 22a of the chromium-tape detecting switch actuator 22A.

Since the two springs 9 and 10 are provided such that the sum of the forces of the two springs is substantially constant over the entire swing area of the cassette holder 7A, the pressing force applied to the cassette holder 7A is constant, and therefore smooth and stable operations are obtained.

The cassette holder 7A is locked in its closed state by causing the lock pin 13 provided in the bracket 12A to engage with the pawl portion 15A attached to the upper chassis 14. The pawl portion 15A, having a circular arc portion 15a at its front end, is pivoted on the upper chassis in FIG. 2 and urged to rotate by a spring 61 in the clockwise direction in the drawing while being restricted in rotation when it abuts the upright portion 14a of the upper chassis 14.

Referring to FIGS. 10A to 10F, the lock/unlock operations by this pawl portion 15A will be now described. The lock pin 13A is at first in abutment with the circular arc portion 15a of the pawl section 15a of the pawl section 15A in the vicinity of the lock position (FIG. 10A). When the lock pin 13A is further advanced by the pressing force acting on the lock/eject button 33A of the cassette holder 7A, the pawl portion 15A is rotated in the counter clockwise direction in the drawing against the force of the spring 61 (FIG. 10B). Thereafter, the lock pin 13A engages with the hook portion 15b of the pawl 15A to provide the lock state (FIG. 10C). In the unlocking operation (ejecting operation), the lock pin 13A is pressed again to cause the lock pin to further advance from the lock position (FIG. 10D), and at the same time, the pawl portion 15A is slightly rotated in the clockwise direction in the drawing by the force of the spring 61 (FIG. 10E). When the pressing force on the lock/eject button 33A is released, the lock pin 13A is run over the lower slant portion 15c of the pawl portion 15A (FIG. 10F) so that the locked state is terminated.

As described above, an over-stroke of the lock pin 13A is required in the lock/unlock operation by the pawl 15A. As explained with reference to FIGS. 2 and 3, however, since the bracket 12A having the lock pin 13A is provided separately from the holder body 11A and since the spring 16 is inserted between the bracket 12A and the lock pin 13A, the bracket 12A is swung in the lock/unlock operation against the force of the spring 16 so that the above-mentioned over-stroke can be obtained. In the locked state, the holder 11A is urged toward the body section 3 with respect to the bracket 12A, which is in its fixed state relative to the body section 3 in the locked state, and, as shown in FIG. 1, the upper rear face of the holder cover 32A mounted on the cassette holder 7A abuts the upper front face of the front panel 52. Therefore, the cassette holder 7A is prevented from rattling.

FIG. 5 shows the locked state of the cassette holder 7A. When the tape cassette 6 is loaded in position, the cassette detection leaf switch 20A attached to the style plate 18A is actuated to detect the loaded tape cassette 6. When the tape cassette 6 is a chromium-tape cassette, the pawl portion 22a of the actuator 22A is fitted into the detecting hole of the tape cassette 6 so that the detecting switch is actuated in response to the insertion of the pawl portion 22A to detect the fact that the tape is a chromium one. Further, the tape cassette 6 is pressed by a cassette pressing spring toward a head (not shown) by a cassette pressing spring 62A located downwardly in the drawing.

Figure 11B:
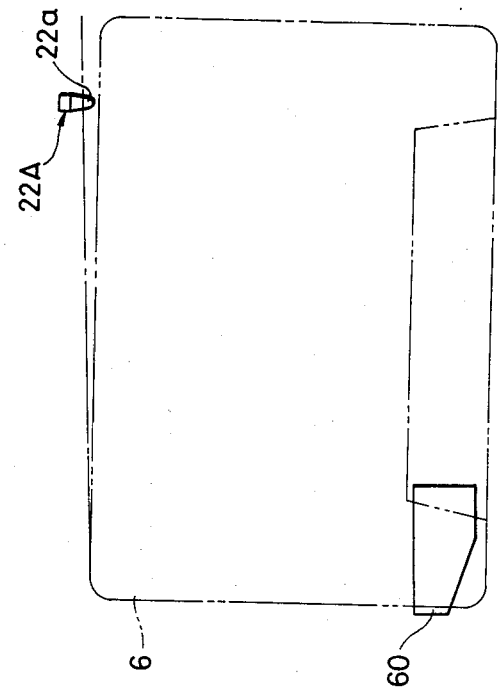
FIGS. 11A and 11B are, respectively, a schematic side view showing a state of the cassette holder upon starting the opening operation and a schematic front view showing the motion of a tape cassette at that time.
Figure 11A:
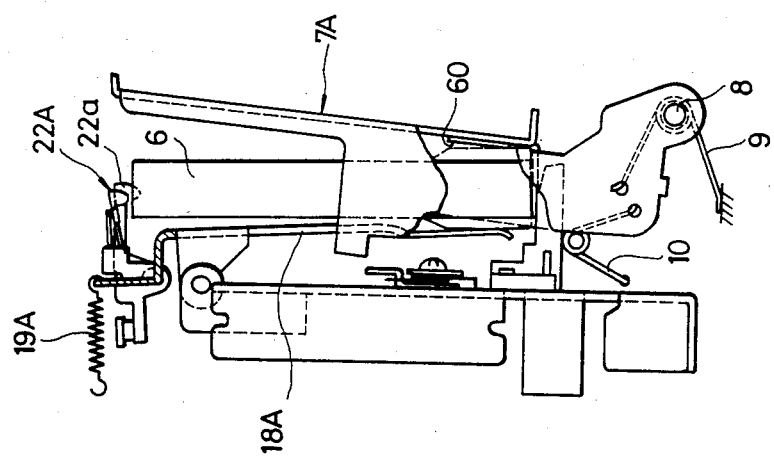

Next, the ejection operation will be explained. As to the unlocking of the cassette holder 7A, the locked state effected by the lock pin 13A and the pawl portion 15A can be easily released merely by the depressing lock/eject button 33A, as explained above with reference to FIGS. 10D, 10E and 10F. First, the cassette holder 7A is caused to begin to swing in the direction of the opened state by the force of the spring 9 (see FIG. 5). When the cassette holder 7A is slightly swung, as shown in FIGS. 11A and 11B, the lower end portion of the tape cassette 6 is pressed by the style plate 18, the left-hand lower portion of the same (in the vicinity of the corner) comes into abutment with the spacer 60 on the inner face of the cassette holder 7A, and a slight gap is formed between the right-hand lower end portion of the tape cassette 6 and the inner face of the cassette holder 7A so that the right side of the cassette half 6 comes down slightly more than the left side of the same and the fitted state between the pawl portion 22a of the pawl actuator 22A and the detecting hole of the tape cassette 6 is released. Thus, the tape cassette 6 can be smoothly ejected. The movement of the tape cassette 6 is effective in the case of chromium and metal tapes. Thereafter, the cassette holder 7A is further swung in the direction toward the opened position mainly by the force of the spring 10 and gradually opened by the function of a damper.

Although the cassette loading/ejecting operations have been described above with reference to the deck section 2A side, similar operations are performed at the deck section 2B side.

Figure 12:
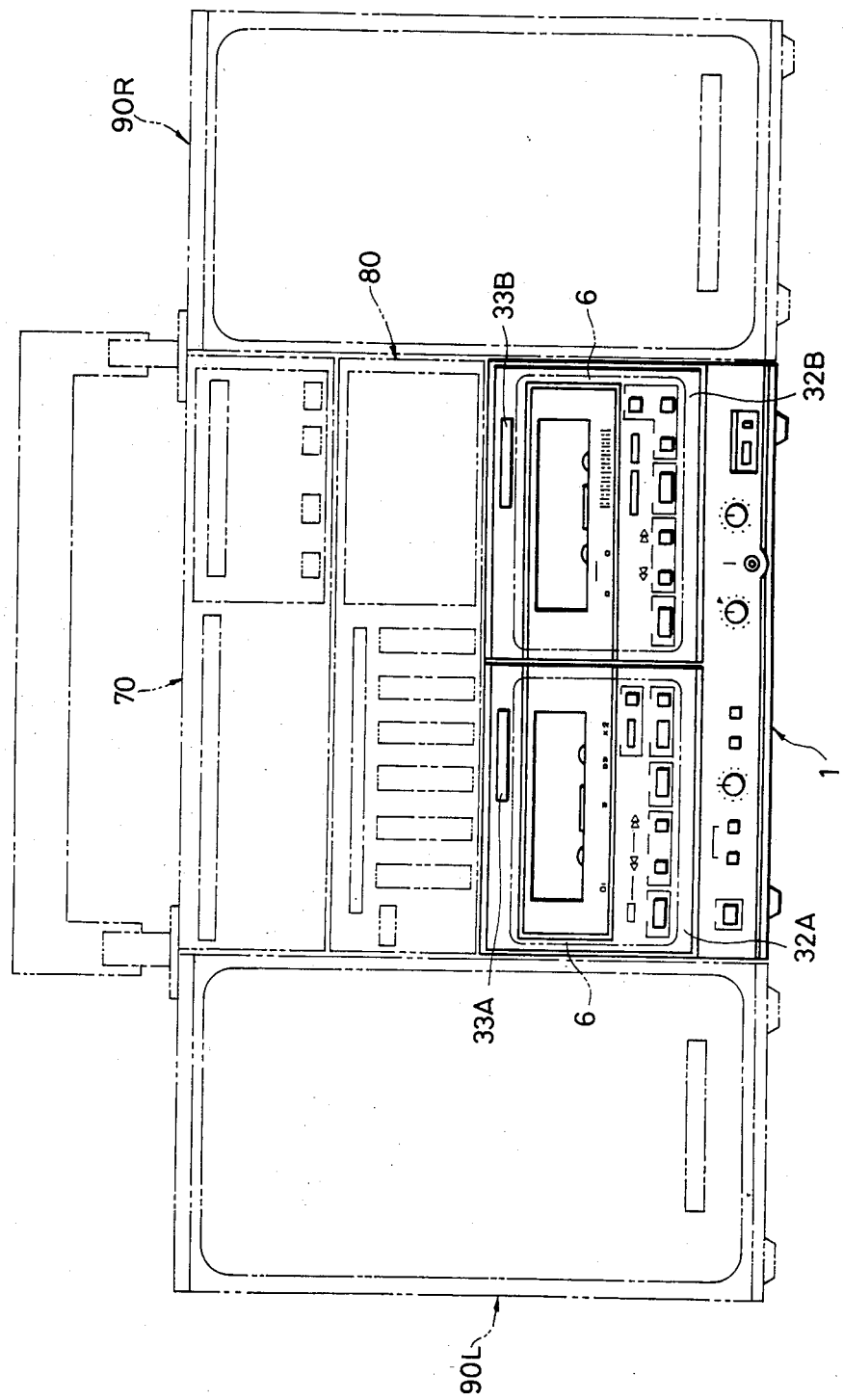
FIG. 12 is a front view showing a state of combination of a cassette tape deck according to the present invention with other components.

According to the construction described above, operating switches and display elements which were disposed outside the cassette holder in the prior arrangement can be disposed within the cassette holder so that the lock mechanism and other mechanisms related to the opening and closing operations of the cassette holder can be substantially contained within the frame of the cassette holder. Accordingly, as apparent from FIG. 12, especially the size in the lateral (width) direction of the cassette tape deck 1 can be reduced to approximately two times of the thickness tape cassette 6 (shown by a two-dot/chain line) so that a highly miniaturized double cassette deck is obtained. Beyond the concept of conventional mini-component stereophonic systems, the double cassette deck according to the present invention is useful not only as a stationary type stereophonic system, but also as a portable stereophonic system in which a tuner 70, an amplifier 80, and speakers 90L and 90R, as shown in FIG. 12 are provided. Also, it is possible to combine the cassette deck with other components such as a micro cassette deck, a digital audio disk player, or the like.

Although the above embodiment was described with reference to the case of a double cassette deck, the present invention is not limited to a double cassette deck, and can be applied to a cassette deck having a single deck section, which may be reduced in size to about half that of the cassette deck shown in FIG. 12.

As described above in detail, according to the present invention, since an operating button for managing the locking of a swingable type cassette holder in its closed state and the release for the locked state of the same is disposed within the cassette holder, it is not necessary to provide an exclusive space for the operating button, thereby greatly contributing to the miniaturization of the cassette deck. Further, since the operational direction of the operating button agrees with the opening/closing direction of the cassette holder, also the operational properties thereof are improved.

We claim:

1. A cassette loading mechanism for a deck body having a cassette container section and a tape drive mechanism, said cassette loading mechanism comprising: a swing-type cassette holder, means for swingably mounting said cassette holder on said cassette container section of said deck body for pivoting about a horizontal axis at a lower end thereof for opening and closing relative to said cassette container section, a plate-like support member for supporting a tape cassette loaded with said cassette holder in a predetermined vertically upright position with respect to a tape drive mechanism, means for swingably supporting said plate-like support member within said cassette container section for rotation about a horizontal pivot axis near the upper end of said plate-like support member, urging means for urging said support member to pivot about the horizontal pivot axis away from said predetermined position, said support member being positioned and having a swingable lower tip end portion pressing against a lower end portion of the tape cassette held by said cassette holder in opposition to the swinging movement of said cassette holder towards cassette loaded position thereby minimizing the radius of swing locus at the top of the tape cassette to decrease the height of the cassette container section thereby contributing to the overall reduction in size of the cassette tape deck.

2. A cassette tape deck operation mechanism for a cassette tape including a deck body having a cassette container section, said cassette tape deck operation mechanism comprising: a swing-type cassette holder, means for mounting said swing-type cassette holder within said cassette container section between open and closed positions, a lock mechanism for locking said cassette holder in its closed state, a holder cover mounted on said cassette holder, said holder cover including an opening therein, and an operating button inserted within said opening and operatively engaging said lock mechanism for controlling the locking operation of said lock mechanism, said holder cover having a pawl portion for preventing the operating button from coming off, an urging arm portion for providing a biasing force to the operating button and a guide portion slidably carrying said operating button, and wherein said pawl portion, said urging arm portion and said guide portion are integrally molded of resin material with said holder cover.

3. A cassette loading/ejecting mechanism for a cassette tape deck having a deck body, a head base, means for mounting said head base for movement between a retracted position and a recording/reproducing position, a drive mechanism for causing said head base to move between said position, a plunger for actuating said drive mechanism, a cassette container section within said deck body, and wherein said cassette loading/ejecting mechanism comprises: a cassette holder mounted within said container section for movement between open and closed position, a lock mechanism responsive to movement of said head base for locking said cassette holder in a closed state when said head base is in a recording/reproducing position thereof, and reset means for releasing the locked mechanism form said locked state by mechanically actuating said plunger.

* * * * *